April 10, 1956    A. L. STRATTON    2,741,279
COMBINATION WOOD AND METAL SAW BLADE
Filed Oct. 31, 1952

INVENTOR.
ALBERT L. STRATTON,
BY
McMorrow, Berman & Davidson
ATTORNEYS

United States Patent Office 2,741,279
Patented Apr. 10, 1956

2,741,279

COMBINATION WOOD AND METAL SAW BLADE

Albert L. Stratton, San Bernardino, Calif., assignor to Robert O. Bormann, Los Angeles, Calif.

Application October 31, 1952, Serial No. 318,037

2 Claims. (Cl. 143—133)

This invention relates to saw blades, and more particularly to blades for the sawing of wood.

An object of the present invention is to provide a saw blade capable of making a saw cut easier, faster, and smoother than saw blades as heretofore proposed.

Another object of the present invention is to provide a saw blade which is adapted for wood cutting whether of the rip, crosscut or mitre type.

A further object of the present invention is to provide a saw blade which cuts with precision through knots or hard wood without jumping.

A still further object of the present invention is to provide a saw blade which is capable of cutting through a nail that may be encountered in the line of cut without affecting the precision of the cut.

Other objects and advantages of the invention will become apparent from the following description taken in conjunction with the accompanying drawing, wherein.

Figure 1:
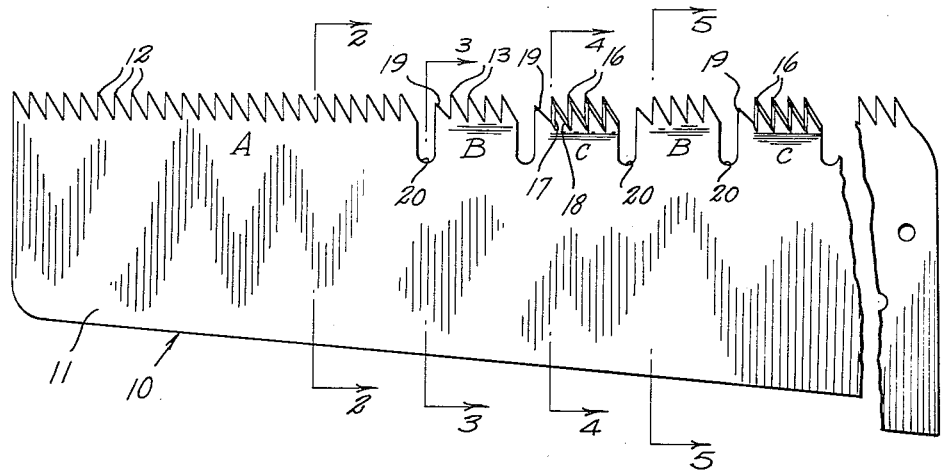
Figure 1 is a longitudinal elevational view of a saw blade, with parts broken away, according to the present invention.
Figures 2, 3, 4, 5:
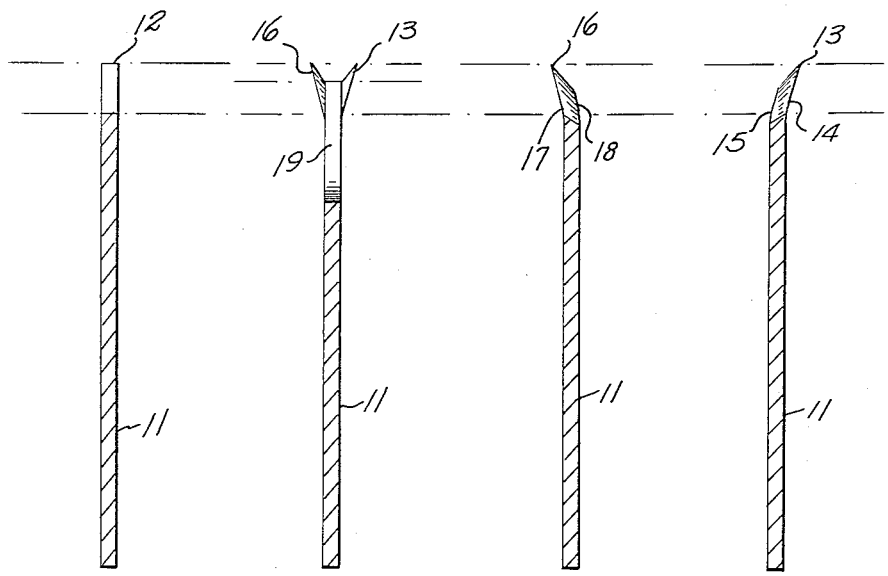
Figure 2 is an enlarged transverse sectional view taken on the line 2—2 of Figure 1.
Figure 3 is a similar sectional view taken on the line 3—3 of Figure 1.
Figure 4 is a similar sectional view taken on the line 4—4 of Figure 1.
Figure 5 is a similar sectional view taken on the line 5—5 of Figure 1.

Referring to the drawings, the numeral 10 designates a saw blade constructed in accordance with present invention, the blade comprising a straight flat body 11 having on one edge a row of cutting teeth A of uniform size and shape, the row extending inwardly from one end of the body to a point spaced from the latter end. The teeth 12 of the row A all lie in the same plane as the body 11. Preferably, the teeth 12 are arranged and sharpened so as to be capable of cutting off a nail or brad that may be encountered in woodwork undergoing repair or having a nail or brad therein positioned so as to make it difficult of removal.

Arranged in longitudinal spaced relation along the one edge of the body 11 intermediate the terminating point of the row A and the other end of the body are groups of teeth B, the teeth 13 of each group being set toward one side of the plane of the body. The teeth 13 are bevelled at their leading and trailing edges 14 and 15 only on their sides opposite to the direction in which they are set. Alternate spaced groups of teeth C are arranged between the groups of teeth B, the teeth 16 of each of the latter named groups being set toward the opposite side of the plane of the body 11. The teeth 16 are bevelled on their leading and trailing edegs 17 and 18 only on their sides opposite to the direction in which they are set.

A raker tooth 19 is at the leading end of each of the groups of teeth B and of the groups of teeth C and lies in the same plane as the body 11, the raker tooth being of a height less than that of the other teeth of the adjacent group.

Intermediate the terminating point of the row of teeth A and the raker tooth 19 of the adjacent group of teeth or group B and between the trailing end and the raker tooth of adjacent groups of teeth or group of group of teeth B and of group of group of teeth C there is a slot 20 which extends transversely inwardly from the one edge of the body 11.

Intermediate the terminating point of the row of teeth A and the raker tooth 19 of the adjacent group of teeth or group B and between the trailing end and the raker tooth of adjacent groups of teeth or group of group of teeth B and of group of group of teeth C there is a slot 20 which extends transversely inwardly from the one edge of the body 11.

In operation, the row of teeth 12 initiate the line of cut in the wood and sever any nail or brad which may be positioned in the wood in the line of cut, and the alternately oppositely set groups of cutting teeth 13 and 16 sever the wood with facility and precision with the raker teeth 19 raking out all of the cuttings and feeding same out of the slots 20 in the saw body 11.

The teeth of the respective groups of teeth are easy to sharpen and reset, and once set are easily accessible for bevelling or sharpening. Also, the arrangement of the teeth and raker teeth make for faster and smoother cutting because for cutting points in each of the group being all set the same way makes four cutting points closer together on one side. In addition, this saw is adapted for cutting from the under side of the wood with equal facility and without jumping.

Having thus described the invention, what is claimed as new and desired to be secured by Letters Patent is:

1. A saw blade for ripping, cross cutting, or mitering comprising a flat body having on one edge a row of cutting teeth of uniform size and shape adapted to cut nails that may be encountered in the work, said row extending inwardly from one end of said body to a point spaced from the latter end, the teeth of said row all lying in the same plane as said body, groups of cutting teeth arranged in longitudinal spaced relation along said one edge of said body intermediate the terminating point of said row and the other end of said body, the teeth of each of said groups being set toward one side of the plane of said body, alternate spaced groups of cutting teeth arranged between said first named groups of teeth, the teeth of each of said alternate groups being set toward the opposite side of the plane of said body, and a raker tooth at the leading end of each of said first mentioned and alternate groups of a height less than that of the other teeth and lying in the same plane as said body there being a slot extending transversely inwardly from said one edge of said body intermediate the terminating point of said row of teeth and the raker tooth of the adjacent group and between the trailing end and the raker tooth of adjacent groups.

2. A saw blade for ripping, cross cutting, or mitering comprising a flat body having on one edge a row of cutting teeth of uniform size and shape adapted to cut nails that may be encountered in the work, said row extending inwardly from one end of said body to a point spaced from the latter end, the teeth of said row all lying in the same plane as said body, groups of cutting teeth arranged in longitudinal spaced relation along said one edge of said body intermediate the terminating point of said row and the other end of said body, the teeth of each of said groups being set toward one side of the plane of said body, and being bevelled on their leading and trailing edges only on their sides opposite to the direction in which they are set, alternate spaced groups of cutting teeth arranged between said first named groups of teeth, the teeth of each of said alternate groups being set toward the opposite side of the plane of said body and being bevelled on their leading and trailing edges only on their sides opposite to the direction in which they are set, and a raker tooth at the leading end of each of said first mentioned and alternate groups of a height less than that of the other teeth and lying in the same plane as said body, there being a slot extending transversely inwardly from said one edge of said body intermediate the terminating point of said row of teeth and the raker tooth of the adjacent group of teeth and between the trailing end and the raker tooth of adjacent groups of teeth.

References Cited in the file of this patent

UNITED STATES PATENTS

| | | |
|---|---|---|
| 388,305 | Ralya et al. | Aug. 21, 1888 |
| 394,222 | Stephens | Dec. 11, 1888 |
| 601,947 | Clemson | Apr. 5, 1898 |
| 1,515,071 | Rothbauer | Nov. 11, 1924 |

FOREIGN PATENTS

| | | |
|---|---|---|
| 538 | Great Britain | Jan. 8, 1913 |
| 684,465 | France | June 26, 1930 |
| 582,703 | Great Britain | Nov. 25, 1946 |